United States Patent
He et al.

(10) Patent No.: US 10,412,396 B2
(45) Date of Patent: Sep. 10, 2019

(54) TRANSFORM COEFFICIENT CODING FOR CONTEXT-ADAPTIVE BINARY ENTROPY CODING OF VIDEO

(71) Applicant: Blackberry Limited, Waterloo (CA)

(72) Inventors: Dake He, Waterloo (CA); Tianying Ji, Toronto (CA); Jing Wang, Waterloo (CA); Xiaofeng Wang, Markham (CA)

(73) Assignee: BlackBerry Limited, Waterloo, Ontario (CA)

( * ) Notice: Subject to any disclaimer, the term of this patent is extended or adjusted under 35 U.S.C. 154(b) by 408 days.

(21) Appl. No.: 14/759,239

(22) PCT Filed: Jan. 16, 2013

(86) PCT No.: PCT/CA2013/050020
§ 371 (c)(1),
(2) Date: Jul. 6, 2015

(87) PCT Pub. No.: WO2014/110651
PCT Pub. Date: Jul. 24, 2014

(65) Prior Publication Data
US 2016/0080749 A1    Mar. 17, 2016

(51) Int. Cl.
*H04N 19/18*    (2014.01)
*H04N 19/60*    (2014.01)
(Continued)

(52) U.S. Cl.
CPC .............. *H04N 19/18* (2014.11); *H04N 7/16* (2013.01); *H04N 19/126* (2014.11);
(Continued)

(58) Field of Classification Search
CPC ...... H04N 19/13; H04N 19/91; H04N 19/593; H04N 19/159; H04N 19/18; H04N 19/176; H04N 19/14; H04N 19/463; H04N 19/129
See application file for complete search history.

(56) References Cited

U.S. PATENT DOCUMENTS 5,253,055 A * 10/1993 Civanlar .............. H04N 21/236
                                                          348/415.1
5,748,244 A    5/1998 Jung
(Continued)

FOREIGN PATENT DOCUMENTS

CA    2804939        1/2012
CA    2804939 A1    1/2012

OTHER PUBLICATIONS

Li Zhang, Qiang Wang, Ning Zhang, Debin Zhao, Xiaolin Wu, Wen Gao, Context-based entropy coding in AVS video coding standard,Signal Processing: Image Communication, vol. 24, Issue 4, 2009, pp. 263-276 (Year: 2009).*

(Continued)

*Primary Examiner* — Gims S Philippe
*Assistant Examiner* — Stefan Gadomski
(74) *Attorney, Agent, or Firm* — Rowand LLP

(57) ABSTRACT

Methods and devices for encoding and decoding video are described that partition transform blocks into coefficient groups. The coefficients within non-zero coefficients are run-length coded in a reverse scan order within the group. Prior to coefficient coding, data is encoded indicating which coefficient group in group scan order is the last to contain a non-zero coefficient. Then data is encoded indicating the position within that last non-zero coefficient group of the last non-zero coefficient in scan order inside the coefficient group. Thus the decoder is able to decode run-length data (Continued)

knowing the positions of the coefficients and eliminating the need for end-of-block flags.

18 Claims, 11 Drawing Sheets

(51) Int. Cl.
  *H04N 7/16* (2011.01)
  *H04N 19/13* (2014.01)
  *H04N 19/147* (2014.01)
  *H04N 19/126* (2014.01)
  *H04N 19/19* (2014.01)
  *H04N 19/93* (2014.01)
  *H04N 19/129* (2014.01)
  *H04N 19/91* (2014.01)

(52) U.S. Cl.
  CPC ............ *H04N 19/129* (2014.11); *H04N 19/13* (2014.11); *H04N 19/147* (2014.11); *H04N 19/19* (2014.11); *H04N 19/60* (2014.11); *H04N 19/91* (2014.11); *H04N 19/93* (2014.11)

(56) References Cited

U.S. PATENT DOCUMENTS

| | | | | |
|---|---|---|---|---|
| 5,825,935 | A * | 10/1998 | Murakoshi | H04N 19/63 375/240.11 |
| 5,920,572 | A * | 7/1999 | Washington | H04N 21/4181 348/476 |
| 6,275,527 | B1 * | 8/2001 | Bist | H04N 19/176 375/240 |
| 2003/0081850 | A1 * | 5/2003 | Karczewicz | H04N 19/176 382/247 |
| 2003/0194007 | A1 * | 10/2003 | Chen | H04N 19/51 375/240.2 |
| 2004/0062314 | A1 * | 4/2004 | Demas | H04N 21/4305 375/240.28 |
| 2004/0066974 | A1 | 4/2004 | Karczewicz et al. | |
| 2004/0073930 | A1 * | 4/2004 | Demas | H04N 21/2365 725/71 |
| 2005/0001840 | A1 * | 1/2005 | Stephenson | G06T 11/203 345/443 |
| 2005/0068208 | A1 * | 3/2005 | Liang | H04N 19/159 341/65 |
| 2006/0072667 | A1 * | 4/2006 | Kirenko | H04N 19/176 375/240.23 |
| 2008/0298698 | A1 * | 12/2008 | Taniguchi | H04N 1/3877 382/245 |
| 2009/0290635 | A1 * | 11/2009 | Kim | H04N 19/159 375/240.02 |
| 2010/0208804 | A1 * | 8/2010 | Yu | H04N 21/2383 375/240.12 |
| 2011/0248873 | A1 * | 10/2011 | Karczewicz | H03M 7/46 341/67 |
| 2012/0099646 | A1 * | 4/2012 | Coban | H04N 19/176 375/240.12 |
| 2012/0140813 | A1 * | 6/2012 | Sole Rojals | H03M 7/4018 375/240.02 |
| 2012/0140822 | A1 * | 6/2012 | Wang | H04N 19/197 375/240.12 |
| 2012/0281768 | A1 | 11/2012 | Matsuba et al. | |
| 2012/0307888 | A1 * | 12/2012 | Guo | H04N 19/176 375/240.02 |
| 2012/0328026 | A1 * | 12/2012 | Sole Rojals | H03M 7/6023 375/240.18 |
| 2013/0003837 | A1 * | 1/2013 | Yu | H04N 19/176 375/240.12 |
| 2013/0003859 | A1 * | 1/2013 | Karczewicz | H04N 19/70 375/240.24 |
| 2013/0027230 | A1 * | 1/2013 | Marpe | H03M 7/4006 341/107 |
| 2013/0051459 | A1 * | 2/2013 | Kirchhoffer | H04N 19/50 375/240.07 |
| 2013/0051475 | A1 * | 2/2013 | Joshi | H04N 19/159 375/240.18 |
| 2013/0177070 | A1 * | 7/2013 | Seregin | H04N 19/13 375/240.02 |

OTHER PUBLICATIONS

Nguyen et al., "Multi-level significance maps for Large Transform Units", Document JCTVC-G644, Nov. 2011 (Year: 2011).*
V. Sze and M. Budagavi, "High Throughput CABAC Entropy Coding in HEVC," in IEEE Transactions on Circuits and Systems for Video Technology, vol. 22, No. 12, pp. 1778-1791, Dec. 2012. (Year: 2012).*
International Search Report dated Sep. 17, 2013, PCT/CA2013/050021.
L. Zhang, Q. Wang, N. Zhang, D. Zhao, X. Wu, W. Gao, "Context-based entropy coding in AVS video coding standard", Signal Processing: Image Communication 24(2009), pp. 263-276.
Nguyen Nguyen, Tianying Ji, Dake He, Gaelle Martin-Cocher, and Lin Song, "Multi-level significance maps for Large Transform Units", JCTVC-G644.
J. Sole, R. Joshi, I. S. Chong, M. Coban, M. Karczewicz, "Parallel Context Processing for the significance map in high coding efficiency", JCTVC-D262.
T. Nguyen, D. Marpe, T. Wiegand, "Non-CE11, Proposed Cleanup for Transform Coefficient Coding", JCTVC-H0228.
Y. Ye and M. Karczewicz, "Improved H.264 intra coding based on bi-directional intra prediction, directional transform, and adaptive coefficient scanning," IEEE Int'l Conf. Image Process.'08 (ICIP08), San Diego, U.S.A., Oct. 2008.
G.J. Sullivan; J.-R. Ohm; W.-J. Han; T. Wiegand (May 25, 2012). "Overview of the High Efficiency Video Coding (HEVC) Standard" (PDF). IEEE Trans. on Circuits and Systems for Video Technology.
Yunfei Zheng, Muhammed Coban, Xianglin Wang, Joel Sole, Rajan Joshi, Marta Karczewicz, "CE11: Mode Dependent Coefficient Scanning", JCTVC-D393.
"Multi-level significance maps for Large Transform Units", Nguyen, Nguyen et al., Nov. 30, 2011.
"Non-CEII: Modified method for two-level coding of significance,maps", Shih-Ta Hsiang et a., Jan. 10, 2012.
CN Office Action dated Feb. 3, 2017, Application No. 201380016680. X.
S-T Hsiang et al., "Non-Cell: Modified Method for Two-Level Coding of Significance Maps", Feb. 2, 2012.
Nguyen et al., "Multi-Level Significant Maps for Large Transforms Units", Nov. 9, 2011.
Supplementary European Search Report dated Jun. 15, 2016.
EPO, Communication pursuant to Article 94(3) EPC, relating to application No. 13872010.7 dated Sep. 12, 2017.
S-T Hsiang et al., "Non-CE11: Modified method for two-level coding of significance maps", 99 MPEG Meeting; Jun. 2, 2012-Oct. 2, 2012; San Jose; (Motion Picture Expert Group or ISO/IEC JTC1/SC29/WG11),, No. m23162, Feb. 2, 2012, XP030051687.
Nguyen, N et al.:, "Multi-level Significant Maps for Large Transform Units", 7. JCT-VC Meeting; 98. MPEG Meeting; Nov. 21-30, 2011; Geneva; (Joint Collaborative Team on Video Coding of ISO/IEC JTC1/SC29/WG11 and ITU-T SG. 16); URL:http://wftp3.itu.int/av-arch/jctvc-site/,, NO. JCTVC-G644, Nov. 9, 2011, XP030110628.

* cited by examiner xCG

|   | 0 | 1 | 2 | 3 |
|---|---|---|---|---|
| 0 | 1 | 1 | 1 | 0 |
| 1 | 1 | 0 | 1 | 1 |
| 2 | 0 | 0 | 1 | n/a |
| 3 | 0 | 0 | n/a | n/a | yCG (row labels), 200 (grid), 202a (arrow to row 1, col 3)

LSCG: xCG = 3, yCG = 1

FIG. 3

| -5 | 1  | 0 | 0 |
| 0  | 0  | 0 | 0 |
| 2  | -1 | 0 | 0 |
| 1  | 0  | 0 | 0 |
700
FIG. 11
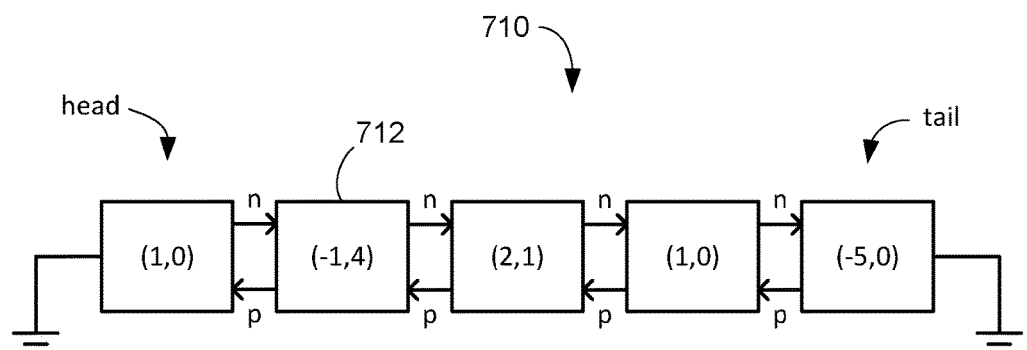
FIG. 12
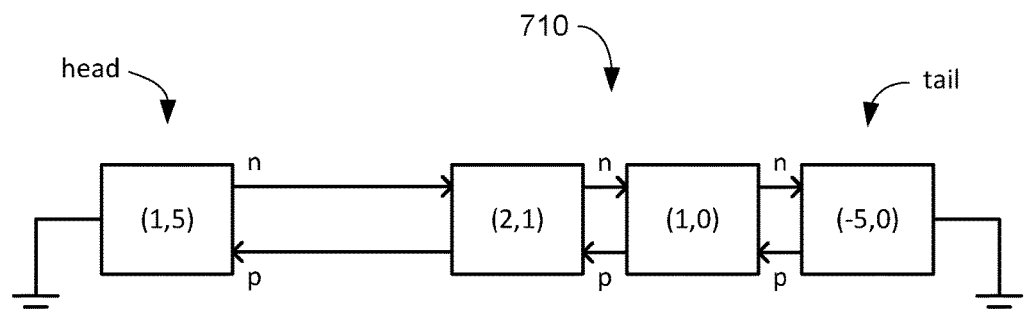
FIG. 13

US 10,412,396 B2

TRANSFORM COEFFICIENT CODING FOR CONTEXT-ADAPTIVE BINARY ENTROPY CODING OF VIDEO

COPYRIGHT NOTICE

A portion of the disclosure of this document and accompanying materials contains material to which a claim for copyright is made. The copyright owner has no objection to the facsimile reproduction by anyone of the patent document or the patent disclosure, as it appears in the Patent and Trademark Office files or records, but reserves all other copyright rights whatsoever.

FIELD

The present application generally relates to data compression and, in particular, to methods and devices for coding transform coefficients in context-adaptive binary entropy coding of video.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur. The advanced Audio and Video coding Standards ("AVS") is an existing audio and video coding standard developed in China. Work is set to begin on developing a next-generation standard to replace AVS, which may be known as AVS2.

Many video coding standards use block-based coding processes. In these processes, the image or frame is divided into blocks, typically 4×4 or 8×8, although non-square blocks may be used in some cases, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction).

To compress data, the coding of the quantized transform coefficients is designed to take advantage of characteristics of the transform to improve compression. In the case of AVS, the coefficients are coded using a quadruple: level, run, sign, end-of-block (EOB) flag. The coding is in a reverse zig-zag direction starting from the last non-zero coefficient in a transform block (hence the requirement for the EOB flag).

The level-minus-one and run data is binarized using unary binarization and the bins are then coded using context-based entropy coding. AVS specifically uses arithmetic coding for the transform coefficient data.

There are some drawbacks to the existing coding scheme for AVS. In some cases, long runs can occur. In the case of a 32×32 block, the worst case run is 1023. When binarized, this results in a number with 1024 bins to be coded. The EOB flags present a similar worst-case overhead. For example, with a 32×32 block the worst case scenario is 1024 non-zero coefficients, which means 1023 EOB flags. Finally, due to the coding scheme adopted for AVS, the decoder does not have any a priori knowledge regarding the location of transform coefficients within the block until all transform coefficients have been decoded. This prevents this data from being used to improve context determination or other coding decisions.

BRIEF DESCRIPTION OF THE DRAWINGS

Reference will now be made, by way of example, to the accompanying drawings which show example embodiments of the present application, and in which:

FIG. 3 shows one example of CG flags mapped to a transform block;

FIG. 11 shows an example coefficient group;

FIG. 12 diagrammatically illustrates a doubly-linked list containing the level-run pairs corresponding to the coefficient group of FIG. 11;

FIG. 13 shows the doubly-linked list of FIG. 12 after a non-zero coefficient is turned to a zero coefficient due to RDOQ.

Similar reference numerals may have been used in different figures to denote similar components.

DESCRIPTION OF EXAMPLE EMBODIMENTS

Figure 1:
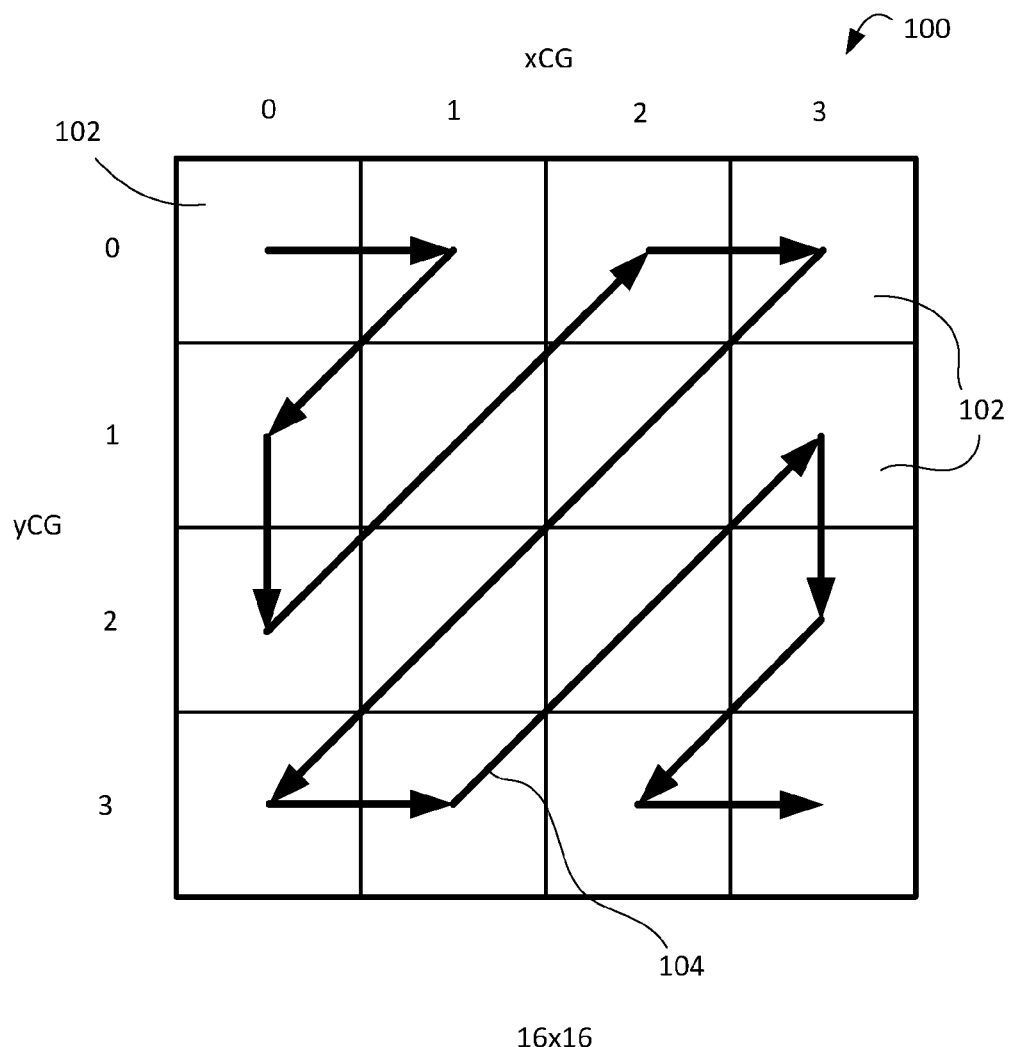
FIG. 1 shows an example of a transform block partitioned into coefficient groups and illustrates a zig-zag group scan order.

In a first aspect, the present application describes a method of decoding video from a bitstream of encoded video using a video decoder, the video including a picture partitioned into blocks, residual data for the blocks being spectrally transformed into transform blocks, each transform block being further partitioned into coefficient groups. The method includes decoding last-coefficient-group data indicating the last coefficient group in a group scan order to contain a non-zero transform coefficient; decoding last-coefficient data indicating the position, in said last coefficient group, of the last non-zero transform coefficient in a scan order within the last coefficient group; and decoding level, run, and sign data for said last coefficient group to reconstruct the transform coefficients of the last coefficient group.

The present application further discloses a method of encoding video using a video encoder, the video including a picture partitioned into blocks, residual data for the blocks being spectrally transformed into transform blocks, each transform block being further partitioned into coefficient groups. The method includes encoding last-coefficientgroup data indicating the last coefficient group in a group scan order to contain a non-zero transform coefficient; encoding last-coefficient data indicating the position, in said last coefficient group, of the last non-zero transform coefficient in a scan order within the last coefficient group; and encoding level, run, and sign data for said last coefficient group to reconstruct the transform coefficients of the last coefficient group.

In another aspect, the present application describes a method of encoding video using a video encoder, the video including a picture partitioned into transform blocks of transform coefficients, each block being further partitioned into coefficient groups, wherein transform coefficients are encoded using level-run coding in reverse scan order. The method includes, for each coefficient group that contains a non-zero transform coefficient, forming a doubly-linked list having a node for each level-run pair in that coefficient group, each node between a head node and a tail node being linked to a previous node in the reverse scan order and to a next node in the reverse scan order, wherein the head node corresponds to a last non-zero coefficient in scan order and the tail node corresponds to a first non-zero coefficient in scan order, the head node having no previous node and the tail node having no next node; and, for each node in the list, selecting a level based upon a rate-distortion optimization expression. If the selected level is non-zero and is different from the level of the current node, then that node's level is updated based upon the selected level, and if the selected level is zero, that node is removed from the doubly-linked list and the run value of its previous node is updated.

In a further aspect, the present application describes encoders and decoders configured to implement such methods of encoding and decoding.

In yet a further aspect, the present application describes non-transitory computer-readable media storing computer-executable program instructions which, when executed, configured a processor to perform the described methods of encoding and/or decoding.

Other aspects and features of the present application will be understood by those of ordinary skill in the art from a review of the following description of examples in conjunction with the accompanying figures.

In the description that follows, some example embodiments are described with reference to the AVS standard for video coding and/or the developing AVS2 standard. Those ordinarily skilled in the art will understand that the present application is not limited to AVS or AVS2 but may be applicable to other video coding/decoding standards, including possible future standards, multi-view coding standards, scalable video coding standards, and reconfigurable video coding standards.

In the description that follows, when referring to video or images the terms frame, picture, slice, tile and rectangular slice group may be used somewhat interchangeably. A series of frames/pictures may be called a "sequence" in some cases. Other terms may be used in other implementations. It will also be appreciated that certain encoding/decoding operations might be performed on a frame-by-frame basis, some are performed on a slice-by-slice basis, some picture-by-picture, some tile-by-tile, and some by rectangular slice group, depending on the particular requirements or terminology of the applicable image or video coding standard. In any particular embodiment, the applicable image or video coding standard may determine whether the operations described below are performed in connection with frames and/or slices and/or pictures and/or tiles and/or rectangular slice groups, as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment. This also applies to coding tree units, coding units, prediction units, transform units, etc., as will become apparent in light of the description below. The term "block" may be used to refer to a coding tree unit, coding unit, prediction unit, or transform unit, depending on the context in which it is used.

It will be understood that the encoder or the decoder described herein may each be implemented on an application-specific or general purpose computing device, containing one or more processing elements and memory. The operations performed by the encoder or decoder, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder or decoder may be implemented will be appreciated by those ordinarily skilled in the art having regard to the following description.

The encoder receives a video source and produces an encoded bitstream. The decoder receives the encoded bitstream and outputs a decoded video frame. The decoder may be implemented as part of a video playback device, i.e. the output video may be displayed on a display device. It will be understood that the video playback machine, such as a computer, set-top box, DVD or Blu-Ray player, and/or mobile handheld device, may buffer decoded frames in a memory prior to display on a display device. The encoder and decoder may be configured to operate in conformance with a number of video compression standards. For example, the encoder and decoder may be AVS-compliant. In other embodiments, the encoder and decoder may conform to other video compression standards, including evolutions of the AVS standard, like AVS2.

As with any block-based hybrid coding framework, AVS partitions a picture/frame into blocks. A prediction operation is used to generate a prediction block. The prediction may be spatial prediction, i.e. intra prediction, in which local reconstructed pixels are the basis for the prediction, or the prediction may be temporal prediction, i.e. inter prediction, in which reconstructed pixels from nearby pictures/frames are the basis for the prediction. The difference between the prediction block and the original data is a residual or error that is then encoded.

The residual is encoded by first spectrally transforming the residual using, for example, a DCT (or DST, or wavelet transform, etc.) operation to transform the block of residual data to a block of transform coefficients. The upper-left-most coefficient is the DC coefficient and the other coefficients are progressively higher frequency coefficients the further they are away from the upper-left-most coefficient. In many cases, the bottom right portion of the transform block is likely to contain all zero coefficients, which is why the spectral transform assists in compression.

The transform coefficients are then quantized using a quantization step size. In some cases, the quantization step size may be fixed for a given sequence, picture/frame, or block. In some cases, the quantization step size is more generically a quantization matrix, in which different coefficient positions in a transform block may be subjected to quantization using a position-specific quantization step size.

The transform and quantization operations are integrated into a single operation in some embodiments. In some cases, the description herein may refer to quantized transform coefficients as "transform coefficients" or "coefficients" for brevity. It will be appreciated that when referring to the entropy encoding of "transform coefficients" or "coefficients", those transform coefficients will typically have been quantized.

The block of quantized transform coefficients are entropy encoded in accordance with the syntax and coding scheme prescribed by the applicable coding standard. In the case of AVS, the coefficients are read in a reverse scan order, where the scan order is defined as a zig-zag scan order progressing from the upper-left-most coefficient to the bottom-right-most coefficient. The actual encoding in AVS starts with the last significant coefficient in the block, i.e. the last non-zero coefficient in the scan order, and proceeds in reverse scan order back towards the upper-left-most coefficient. The data encoded includes quadruples of [level, run, sign, EOB]. The level indicates the magnitude of a current non-zero coefficient (minus 1), the run indicates the number of zero coefficients between the current coefficient and the next non-zero coefficient in reverse scan order, the sign indicates the sign of the non-zero coefficient, and the EOB flag indicates whether this current coefficient is the 'first' non-zero coefficient in the scan order in the block, i.e. whether this is the last non-zero coefficient to be coded in reverse scan order for this block.

The run and level values are binarized using unary binarization. The binarized data is then context-adaptive entropy encoded.

As noted above, the EOB flags represent a significant overhead cost in blocks that have relatively many non-zero coefficients. Moreover, the run value may be large in sparse blocks with at least one high-frequency non-zero coefficient, which leads to encoding a large number of bins due to the unary binarization scheme. Finally, the decoder does not know the positions in the block of any of the data being decoded until it has finished decoding all the transform coefficient data and has detected the EOB flag indicating that the current non-zero coefficient finishes the data for the block.

The present application provides for methods and systems that eliminate the use of EOB flags through signaling last significant-coefficient data. Moreover, to improve compression efficiency, reduce computational complexity, and/or simplify the transform coding design, the present application provides for methods and system in which each block is further partitioned into non-overlapping coefficient groups. In many embodiments, the coefficient groups are square blocks, e.g. 4×4, although in some embodiments they may be non-square, e.g. 2×8 or, in some cases, a 1-D sequence of coefficients in scan order. In some cases a coefficient group may be referred to as "sub-block" or a "sub-coded block".

Reference is now made to FIG. 1, which shows an example of a transform block 100. In this case, the transform block 100 is a 16×16 block of transform coefficients. The transform block 100 has been partitioned into sixteen 4×4 coefficient groups (CGs), some of which are labeled by reference numeral 102. Each of the coefficient groups 102 contains sixteen transform coefficients.

The encoding of the transform coefficients is performed coefficient-group-by-coefficient-group. That is, the sixteen transform coefficients of one coefficient group are encoded before moving to the next coefficient group.

A group scan order 104 is indicated in FIG. 1. The group scan order 106 in this example is a zig-zag scan order starting at the upper-left-most coefficient group and progressing towards the lower-rightmost coefficient group. In some embodiments, the coefficient groups are encoded/decoded in reverse group scan order, meaning that the upper-left-most coefficient group is the last coefficient group to be encoded/decoded.

Figure 2:
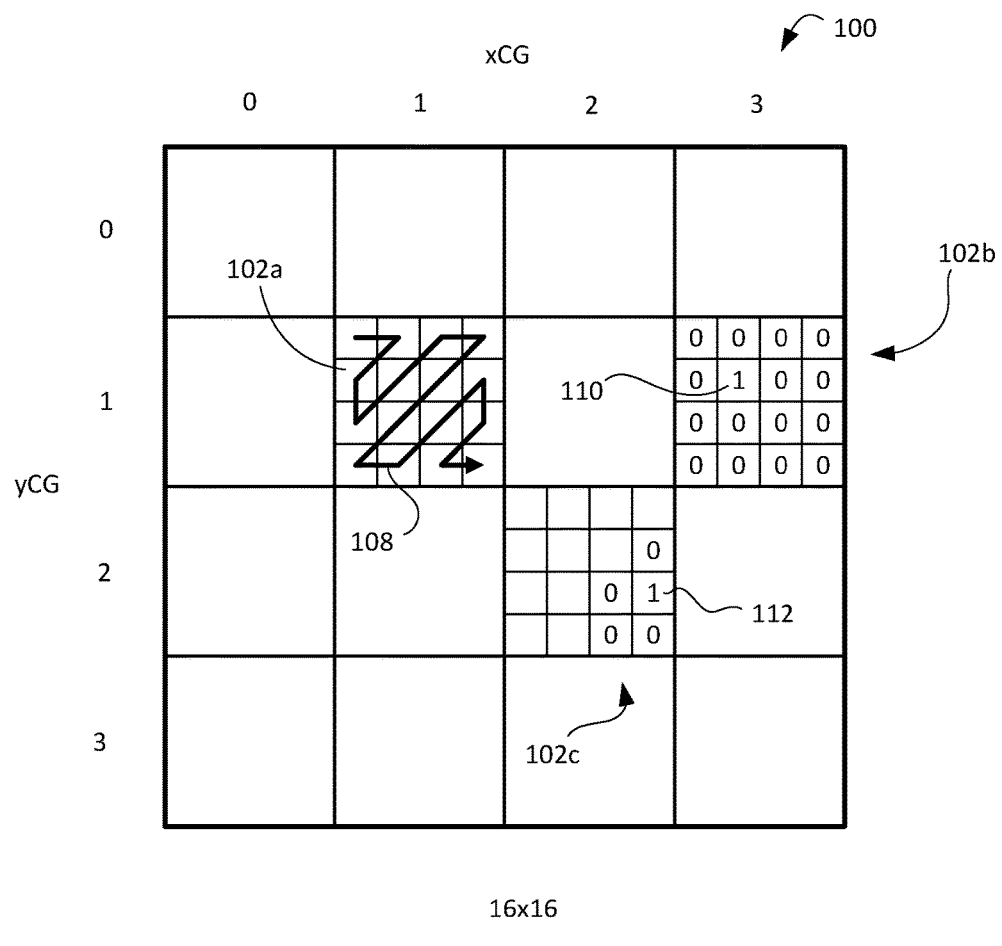
FIG. 2 shows the example transform block of FIG. 1, with an example of a zig-zag scan order in a coefficient group.

Reference is now also made to FIG. 2, which shows the transform block 100 and a scan order 108 within one of the coefficient groups 102a. The scan order 108 within a coefficient group orders the processing of the coefficients within that coefficient group. In this example, the scan order 108 is a zig-zag scan ordering of the coefficients. In some embodiments, the coefficients are encoded/decoded, specifically their level-run-sign data, in the reverse of the scan order 108 ("reverse scan order"). The reverse scan order starts at the bottom-right-most coefficient and progresses in zig-zag scan towards the upper-left-most coefficient.

It will be understood that the zig-zag-based scan order and group scan order described in these examples represent one possible set of scan orders. The scan order or the group scan order in other embodiments may be diagonal, vertical, horizontal, or any other prescribed ordering of the positions in the block and/or coefficient group. In one embodiment, the group scan order and the scan order within a coefficient group may be different, i.e. one may be zig-zag and the other may be diagonal, for example.

The partitioning of the transform block 100 into coefficient groups 102 (shown as 102a, 102b, 102c) enables the use of a CG flag to signal whether a particular coefficient group contains any non-zero coefficients or not. If all coefficients of a coefficient group are zero, then the encoder need not encode any data other than the CG flag. That is, the encoder only encodes level, run, and sign data for coefficient groups that have non-zero coefficients, e.g. those coefficient groups that have a CG flag set to one. In some cases, the CG flag of the upper-left-most coefficient group may be presumed to be set to one; that is, the CG flag of this coefficient group is not coded and the coefficients (their level-run-sign data) are always coded.

In some embodiments, the CG flags may be sent as a set and then the coefficient data for each non-zero CG sent in reverse group scan order. In some other embodiments, each CG flag that indicates that the CG contains a non-zero coefficient may be followed in the encoded bitstream by the data for that CG, e.g. the level, run, and sign data, before the next CG flag is encoded (i.e. the CG flags may be interleaved with the level-run-sign data).

Rather than sending EOB flags, the present application proposes that the position of the last non-zero coefficient in the transform block be coded. Once the decoder knows the position of the last non-zero coefficient in the transform block, then as it decodes level-run data, it will know when it has reached the last coefficient in the coefficient group, making EOB flags unnecessary. Moreover, the present application proposes to code two-level last coefficient position information: (a) the position of the last coefficient group in the group scan order that contains a non-zero coefficient, and (b) the position of the last non-zero coefficient in that last coefficient group. Thus the decoder will know the coordinates of the last non-zero coefficient and, therefore, the positional information associated with all the subsequently-decoded CG flags, level, run, and sign data for the transform block.

FIG. 2 shows a non-zero coefficient 110 in the coefficient group 102b and a non-zero coefficient 112 in the coefficient group 102c. Under the old AVS coding approach, the non-zero coefficient 112 would be the last coefficient in reverse zig-zag scan order across the whole transform block 100. However, in accordance with this example embodiment of the present application, the last non-zero coefficient group in reverse group scan order is coefficient group 102b, and the last non-zero coefficient within that coefficient group is the non-zero coefficient 110. Accordingly, the encoder encodes the position of coefficient group 102b and the position of the non-zero coefficient 110 within that coefficient group 102b. The encoder then goes on to encode the CG flags for the remaining coefficient groups between the last coefficient group 102b and the upper-left-most coefficient group (for which the CG flag may be inferred to be 1), and the level-run-sign data for each coefficient group that has an associated CG flag set to be (or inferred to be) 1. As will be described later below, the last coefficient position within each non-zero CG may also be encoded, in some example embodiments. In other embodiments, a "last run" may be encoded for the next CG to specify the number of zeros between the bottom-right-most coefficient and the last non-zero coefficient in that next CG, or, in some embodiments, the run data may cross CG boundaries (and may skip over all-zero CGs in the reverse group scan order).

FIG. 3 shows an example 16×16 transform block 200 partitioned into 4×4 coefficient groups. The last coefficient group 202a is located at xCG=3, yCG=1. These coordinates may be binarized and encoded in some embodiments. In other embodiments, the position of the last non-zero coefficient group may be signaled as the coefficient group's position in the group scan order, which in this example is 12 (in the range 0, 1, . . . , 15). The value of the CG flags for respective coefficient groups is shown in the associated coefficient group in FIG. 3. It will be appreciated that the CG flag for the last coefficient group 202a need not be encoded since it is known to contain non-zero coefficients on the basis that it is the last coefficient group. In some embodiments, the CG flag for the first coefficient group at xCG=0, yCG=0 may also be inferred to be 1, irrespective of whether it contains any non-zero coefficients, since the likelihood of this coefficient group having all zero coefficients is very small. If both these CG flags are omitted (as indicated by square brackets below), then the coded CG flags in reverse group scan order, for this example, are:

[1] 1 0 0 0 1 0 1 0 0 1 1 [1]

Figure 4:
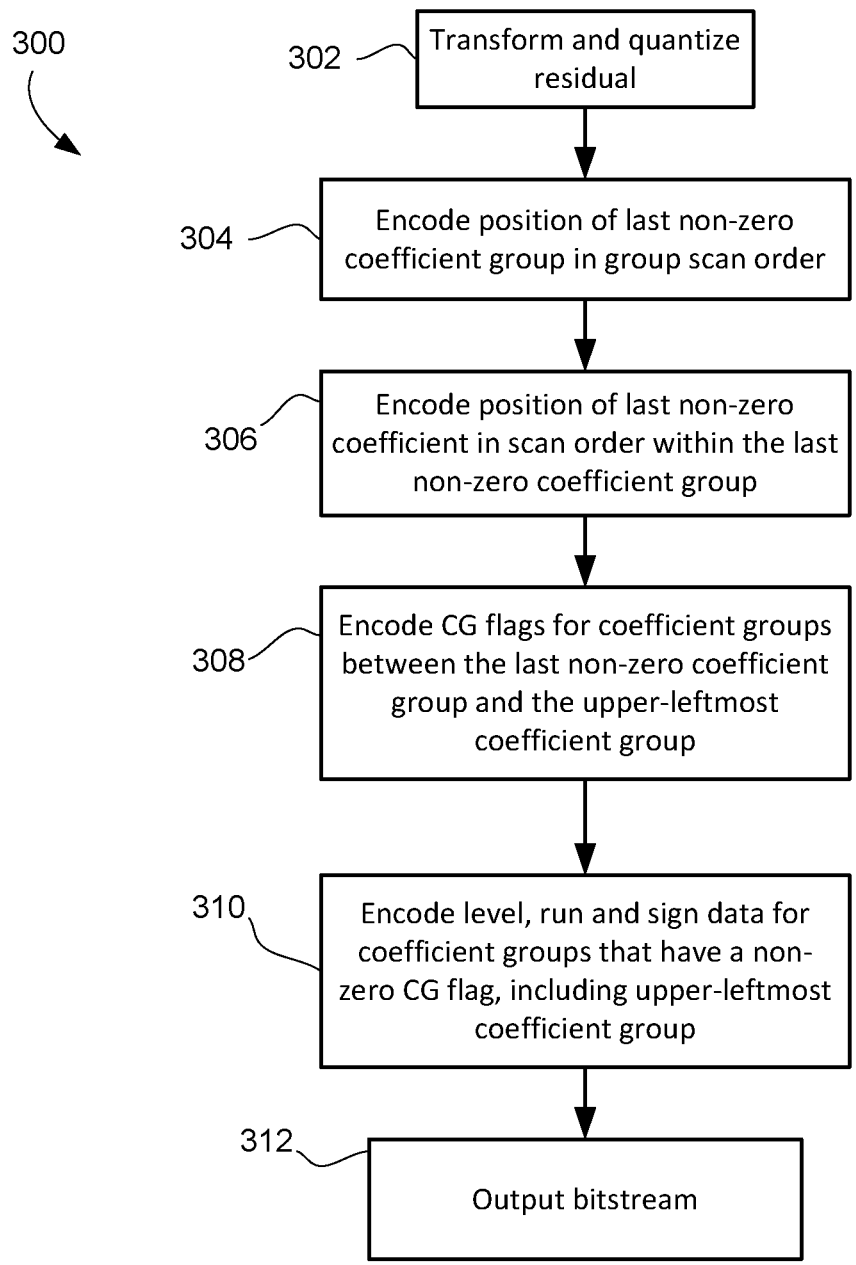
FIG. 4 shows, in flowchart form, one embodiment of a method of encoding using level-run information and coefficient group partitioning.

Reference is now made to FIG. 4, which shows in flowchart form, one example process 300 for encoding transform coefficients in a video encoder. As noted in operation 302, the block of residual data is first transformed and quantized to produce the block of quantized transform coefficients. Recall that the present example embodiment supposes that the transform block, whether 8×8, 16×16, 32×32 or some other size, is partitioned into coefficient groups. The coefficient groups may be square groups of transform coefficients. In some cases, they may be 2×2, 4×4, 6×6, 8×8, or some other size. The coefficient group size may depend on the transform block size in some implementations.

In operation 304, the encoder encodes the position of the last non-zero coefficient group in group scan order. Group scan order is the ordering of the coefficient groups from upper-left-most to bottom-right-most. In this example, the group scan order may be a zig-zag scan order. The last of these coefficient groups that contains a non-zero coefficient is the last non-zero coefficient group. Its position in the transform block is encoded in operation 304.

In operation 306, the encoder encodes the position of the last non-zero coefficient in that last non-zero coefficient group. The position encoded is the position within the coefficient group and not the absolute position within the transform block, since the coefficient group position has already been encoded. The last non-zero coefficient in that coefficient group is the last non-zero coefficient in the scan order within the coefficient group.

The CG flags for all coefficient groups between the last non-zero coefficient group and the upper-left-most coefficient group, in reverse group scan order, are then encoded in operation 308. In this embodiment, the CG flags are not interleaved with level-run data.

In operation 310 the level, run, and sign data for the coefficient groups that have non-zero coefficients are then encoded. This includes the coefficient groups for which the CG flag may be inferred to be 1, irrespective of whether it contains non-zero coefficients, such as the upper-left-most coefficient group in some embodiments.

Finally, in operation 312, the encoded data is output in the bitstream.

Figure 5:
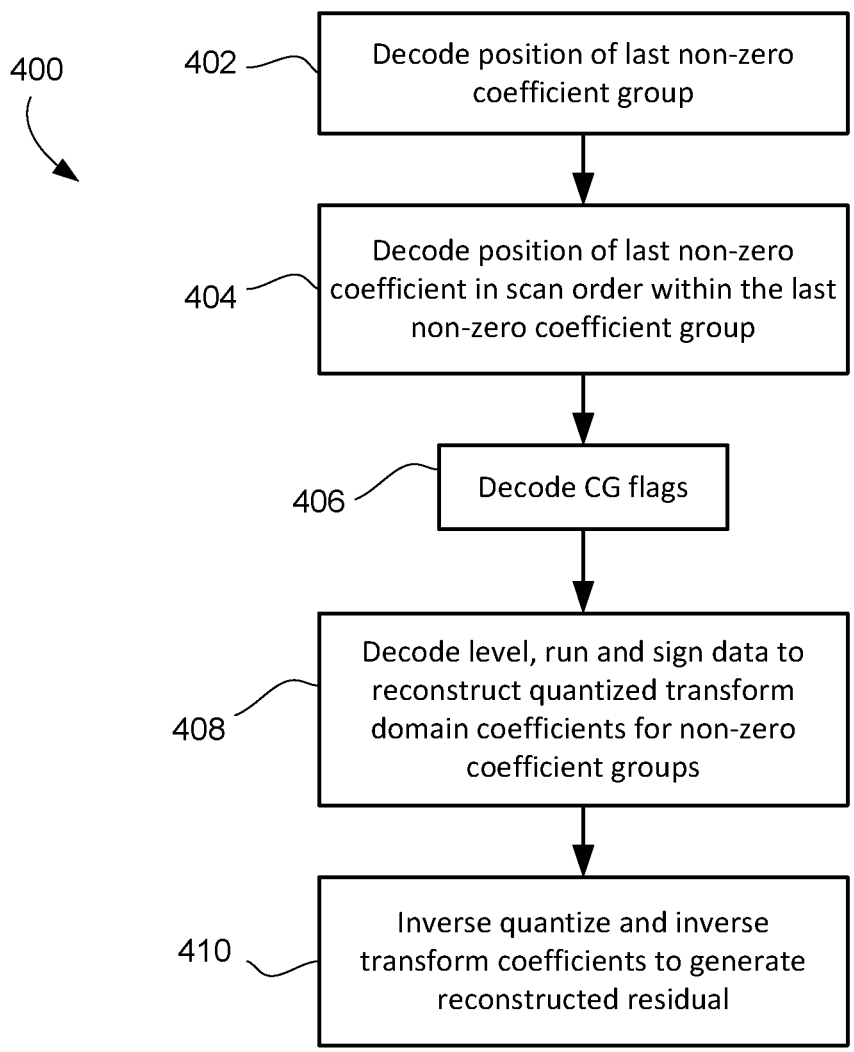
FIG. 5 shows, in flowchart form, one embodiment of a method of decoding level-run information to reconstruct a residual.

The corresponding operation at the decoder is illustrated in flowchart form in the example process 400 shown in FIG. 5. At operation 402, the decoder decodes the position of the last non-zero coefficient group in the group scan order. Thus the decoder is able to identify which coefficient group in the transform block is the last coefficient group in group scan order that contains a non-zero coefficient. In operation 404, the decoder then decodes the position of that last non-zero coefficient in scan order within the last non-zero coefficient group.

The decoder then decodes the coefficient group flags in operation 406. A CG flag may be decoded for each coefficient group between the last non-zero coefficient group and the upper-left-most coefficient group in reverse group scan order. Note that this example presumes that the CG flag for the upper-left-most coefficient group is inferred to be 1, although in other example embodiments it may be encoded/decoded. Thus the decoder is able to identify which coefficient groups in the transform block contain non-zero coefficients and, thus, whether they have had level, run, and sign data encoded for their coefficients.

In operation 408, the decoder decodes level, run and sign data for the non-zero coefficient groups so as to reconstruct the quantized transform domain coefficients for those coefficient groups. As will be detailed below, the decoder may decode last-run data for each non-zero coefficient group, last non-zero coefficient position data for each non-zero coefficient group, or run data that span coefficient group boundaries, depending on the implementation. The all-zero coefficient groups are reconstructed as all zero coefficients.

In operation 410, the decoder inverse quantizes and inverse transforms the reconstructed transform block of coefficients so as to generate a reconstructed residual block. Through combination with subsequent prediction operations, filtering, etc., the decoder outputs reconstructed pixel data.

It will be understood that some operations of the above-described processes can be varied such that they occur in a different order, or interleaved, or in combination, as will be understood by those skilled in the art having regard to the full description herein.

Coding Last Non-Zero CG Position

As described above, the present application provides for signaling the position of the last non-zero coefficient, in part, by encoding the position of the last coefficient group in group scan order that contains a non-zero coefficient. There are various ways that this position can be encoded. Some examples are provided below.

In one example, the last non-zero coefficient group position is signaled using x-y coordinates. For example, xCG may indicate the x-position and yCG may indicate the y-position. Each of these values may be binarized by, for example, unary binarization. In another embodiment, fixed-length binary numerals may be used.

The binarized x-y coordinates are then encoded using context-adaptive encoding. The context for coding the binarized coordinates may be determined based upon the block size and the bin index of the specific bin being coded. Separate context may be used for xCG and yCG. In one example, the context determination may be given by:

ctxInc (lastCGX)=0, if block size is 8×8 and bin index=0;
2, if block size is 16×16 and bin index=0;
4, if block size is 16×16 and bin index=1;
6, if block size is 16×16 and bin index=2;
8, if block size is 32×32 and bin index=0;
10, if block size is 32×32 and bin index=1;
12, if block size is 32×32 and bin index>1;
ctxInc (lastCGY)=1, if block size is 8×8 and bin index=0;
3, if block size is 16×16 and bin index=0;
5, if block size is 16×16 and bin index=1;
7, if block size is 16×16 and bin index=2;
9, if block size is 32×32 and bin index=0;
11, if block size is 32×32 and bin index=1;
13, if block size is 32×32 and bin index>1;

In this example, a total of 28 contexts may be used: 14 for luma components and 14 for chroma components.

In another example, the binarization of the x-y coordinates may be based upon a concatenation of a unary prefix and a fixed-length suffix. Note that this may not change the binarized coordinates until the block size reaches 32×32, assuming 4×4 coefficient groups. The suffix may be a single bit. The suffix may then be coded using bypass mode, i.e. equal probability, which avoids a context determination step with respect to coding of that bin. The context for coding the prefix is determined based upon block size and bin index.

In another variation to these examples, the xCG and yCG positions are jointly coded; meaning that a flag is introduced for signaling whether the last non-zero coefficient group is the upper-left-most coefficient group at (0, 0), which tends to be the most probable last non-zero coefficient group. If the flag is set, then no further coding of xCG and yCG is necessary. However if the flag is not set, then the xCG value and yCG value are encoded. But, because the encoder and decoder will know that the xCG and yCG values cannot both be 0, if the encoded/decoded xCG value is zero, then the yCG value will be encoded and decoded as (yCG−1). Example psuedocode illustrating this variation is set out below:

```
Encoder:
    Encode( lastCGX == 0 && lastCGY == 0 )
    if( !( lastCGX == 0 && lastCGY == 0 ) )
    {
        Encode( lastCGX )
        If( lastCGX == 0 )
        {
            Encode( lastCGY − 1 )
        }
        Else
        {
            Encode( lastCGY )
        }
    }
Decoder:
    Decode( lastCG0Flag )
    if( lastCG0Flag == 1 )
```

-continued

```
    {
        lastCGX == 0
        lastCGY == 0
    }
    Else
    {
        Decode( lastCGX )
        If( lastCGX == 0 )
        {
            Decode( lastCGYminus1)
            lastCGY = lastCGYminus1 + 1;
        }
        Else
        {
            Decode( lastCGY )
        }
    }
```

In another example, the last non-zero coefficient group position is signaled using its index in the group scan order. The group scan order orders the coefficient groups from the upper-left-most, at index 0, to the lower-rightmost, at index N×N−1, where N×N is the total number of coefficient groups. The group scan position number is binarized and encoded.

Coding Last Non-Zero Coefficient Position in Last Non-Zero CG

As noted above, the position of the last non-zero coefficient in a transform block is signaled by encoding the position of the last non-zero coefficient group and the position of the last non-zero coefficient in that last non-zero coefficient group. The position of the last non-zero coefficient in the last non-zero coefficient group may be encoded in a manner similar to that described above with respect to coefficient groups, i.e. the x-y coordinates of the coefficient within the coefficient group may be encoded or the position of the coefficient in the scan order within the coefficient group may be encoded.

Because the present application prescribes the partitioning of the transform block into coefficient groups and level-run coding is used to encode/decode coefficient data, the issue of runs that cross coefficient group boundaries needs to be addressed. Using the coefficient group partitioning, the level-run coding takes place using a scan order within each coefficient group. As a result, the run between non-zero coefficients may extend across a coefficient group boundary.

Figure 6:
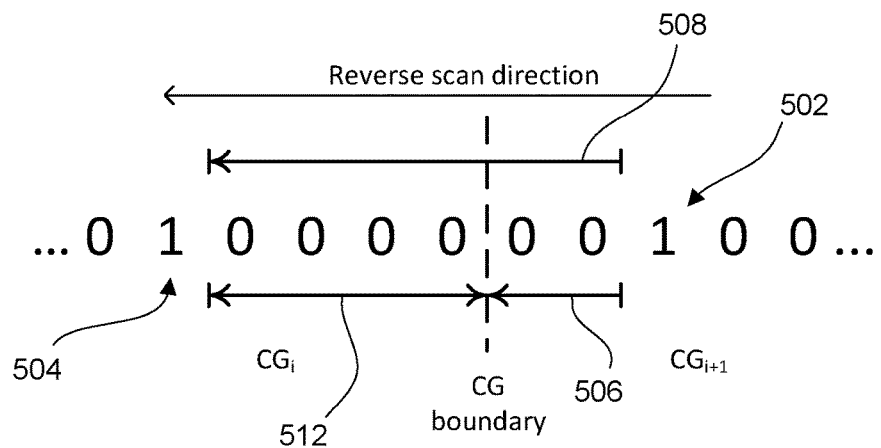
FIG. 6 graphically illustrates an example of level-run coding truncated at a coefficient group boundary.

Reference is now made to FIG. 6, which illustrates two possibilities for run signaling. Coefficient group $CG_{i+1}$ is first encoded/decoded using run, level, and sign data. As indicated, the coding progresses in reverse scan order. The last level-run pair is for coding the coefficient indicated by reference numeral 502. There are two possible approaches to coding the run. One is to code the run 508 that extends across the coefficient group boundary up to the next non-zero coefficient. That is, the run 508 in this example would be 6. The other approach is to coding a truncated run 506. The truncated run 506 stops at the coefficient group boundary, and in this case the run 506 would have a value of 2. It will be appreciated that coding a truncated run will typically result in shorter runs, which is therefore more efficient; however, truncated runs leave the problem of how to code the next coefficient group, i.e. $CG_i$.

If truncated runs are coded, then one possible approach is to encode the position of the last non-zero coefficient for every non-zero coefficient group. That is, each coefficient group for which its associated CG flag is set to 1 would also have the position of its last non-zero coefficient encoded. In this example, the position of coefficient 504 in coefficient group $CG_i$ would be encoded in the bitstream. As will the last non-zero coefficient in the transform block, the coding of the position of each coefficient group's last non-zero coefficient may be based upon x-y coordinates or position in the scan order.

Figure 8:
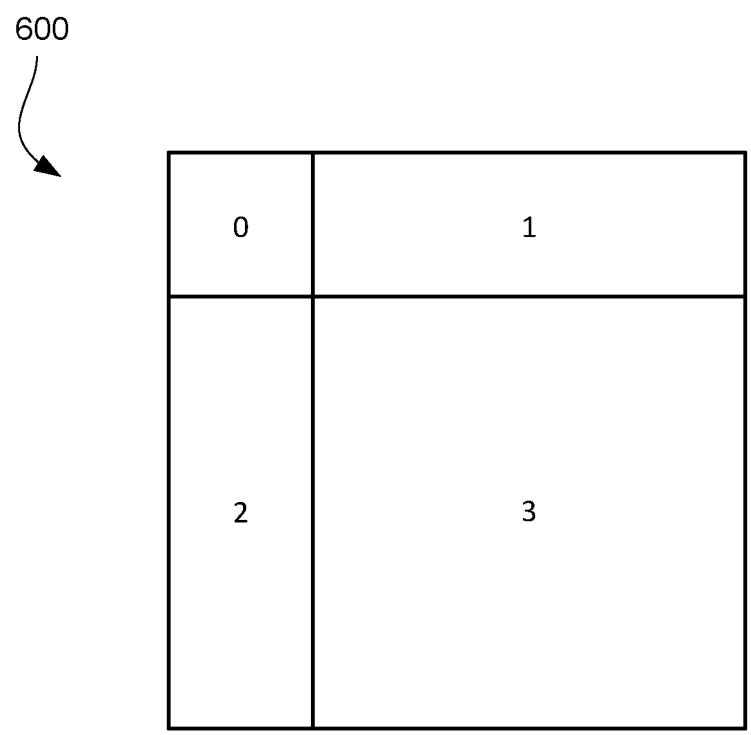
FIG. 8 shows an example of a region partition of a transform block.

The context for coding the position of the last non-zero coefficient may partly depend on the bin index once the position data is binarized, but may also depend on the location of the coefficient group in the block. Reference is now made to FIG. 8, which shows an example 16×16 transform block 600 and regional partitions for context determination. In this case, the block has been divided into four regions. Region 0 is the upper-left-most coefficient group. Region 1 includes the three coefficient groups to the right of the upper-left-most coefficient group and region 2 includes the three coefficient groups below the upper-left-most coefficient group. The other nine coefficient groups are in region 3. The context for coding x and y positions, for example, may be given by:

ctxInc (lastCGX)=regionIndex*6+binIndex
ctxInc (lastCGY)=regionIndex*6+binIndex+3

This example would result in a total of 48 contexts: 24 for luma and 24 for chroma.

Due to the property of the DCT transform, coefficients in CGs in region 1 correspond to the vertical components while coefficients in CGs in region 2 correspond to the horizontal components. Therefore, when the prediction residual contains mostly vertical components, non-zero transform coefficients tend to be located close to the top of the CGs in region 2. Similarly, when the prediction residual contains mostly horizontal components, non-zero transform coefficients tend to be located close to the left of the CGs in region 1. The positions of the last coefficients in CGs in region 1 and region 2 thus show symmetry in this case.

As a result, in one embodiment coding the Y-coordinate in region 2 may share the same contexts as coding the X-coordinate in region 1, and coding the X-coordinate in region 2 may share the same contexts as coding the Y-coordinate in region 1. This is also equivalent to swapping the (X, Y) coordinates of the last coefficient position in CGs in region 2 and coding it using the contexts for region 1.

Another possible approach to handling truncated runs at a coefficient group boundary is to encode/decode the "last run" 512, i.e. the run of zeros from the bottom-right-most coefficient in a coefficient group to the first non-zero coefficient in reverse scan order. Once again, unary binarization may be used in some embodiments. The context for coding the last run 512 may be derived from the position of the coefficient group in the block (as described above), the bin index, and the maximum prior-coded level (i.e. rank). The "rank" is a value linked to the largest level previously coded for that transform block. In one example implementation, rank is determined as:

rank=0, if maximum coded level=0
1, if maximum coded level=1
2, if maximum coded level=2
3, if maximum coded level=3 or 4
4, if maximum coded level>4

In this example, the context may be determined as follows:

ctxInc(lastRun)=rank*2+min(1, binIndex), if the CG is the top-left CG in the block
rank*2+min(1, binIndex)+10, otherwise As noted above, the CG flag of the upper-left-most coefficient group may be inferred to be 1, since it is highly likely that this coefficient group contains at least one non-zero coefficient. In the unlikely case that it does not contain any non-zero coefficients, then a special signal may be sent to indicate that situation. For example, in the case where last run is coded, a special last run value of lastRun=16 may be encoded. Note that lastRun=16 would only be signaled when the significant CG flag has been inferred to be 1.

Figure 7:
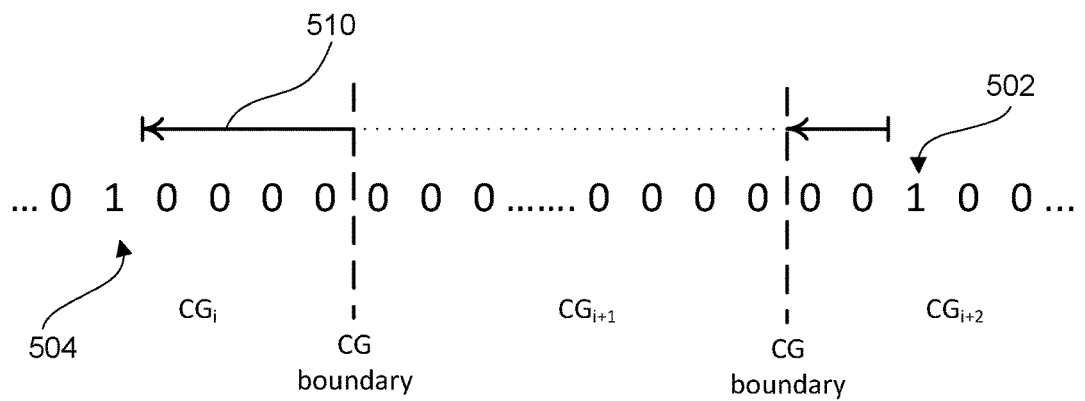
FIG. 7 graphically illustrates an example of level-run coding over coefficient group boundaries.

Reference is now made to FIG. 7, which shows an example embodiment of non-truncated run signaling. In the case where the run 510 is not truncated at a coefficient group boundary, it may be configured to exclude coefficients from all zero coefficient groups in calculating the run. That is, only coefficients in coefficient groups that have an associated CG flag set to 1 are counted in determining the run 510, skipping over any all zero coefficient groups that are encountered in the reverse group scan order, like $CG_{i+1}$ in this example.

Figure 9:
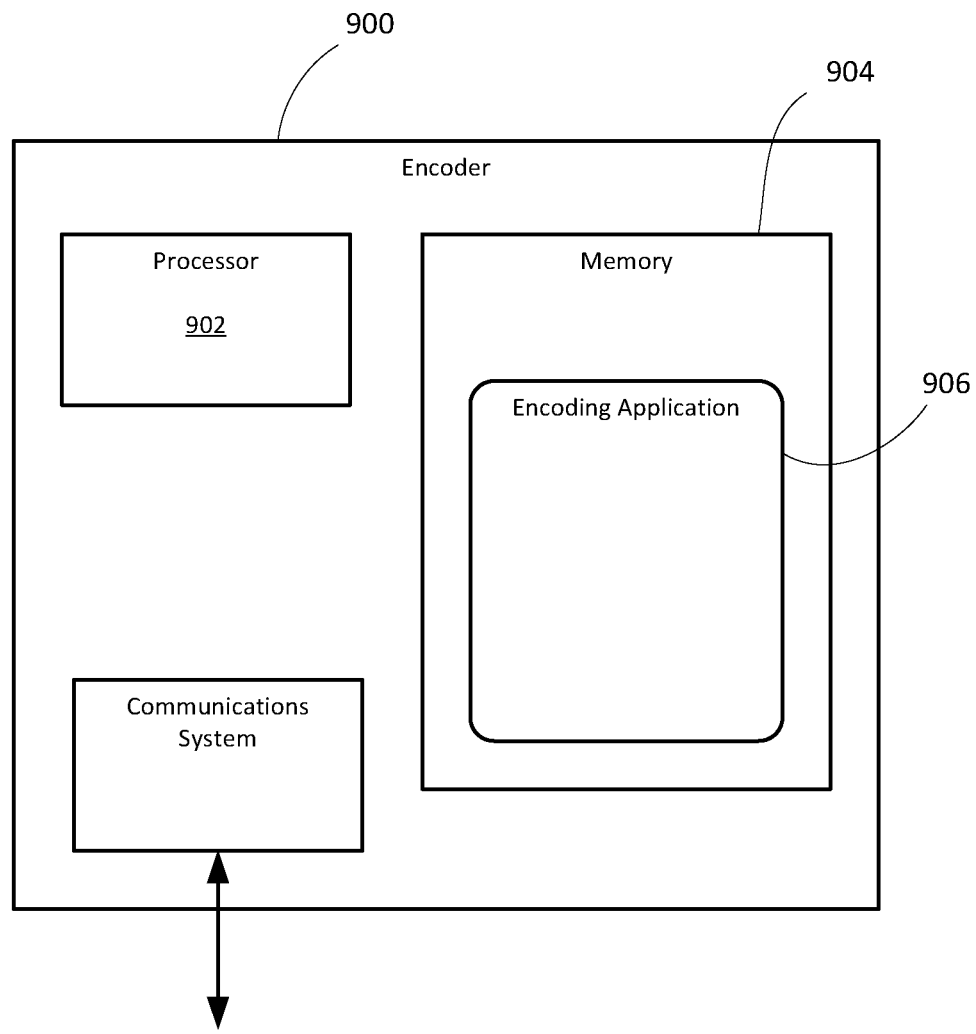
FIG. 9 shows, in block diagram form, one embodiment of a video encoder.

Reference is now made to FIG. 9, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform operations such as those described herein. For example, the encoding application 906 may encode and output bitstreams encoded in accordance with the processes described herein. It will be understood that the encoding application 906 may be stored in on a computer readable medium, such as a compact disc, flash memory device, random access memory, hard drive, etc.

Figure 10:
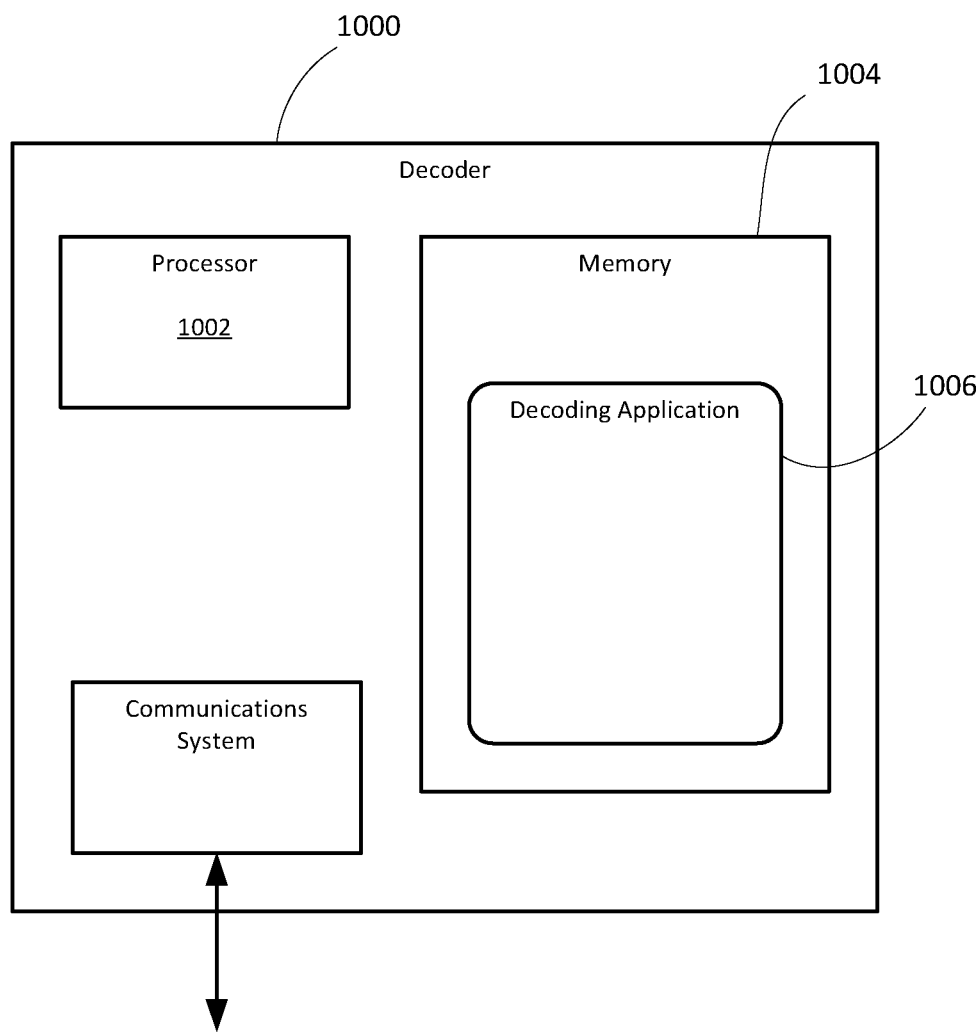
FIG. 10 shows, in block diagram form, one embodiment of a video decoder.

Reference is now also made to FIG. 10, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform operations such as those described herein. It will be understood that the decoding application 1006 may be stored in on a computer readable medium, such as a compact disc, flash memory device, random access memory, hard drive, etc.

Rate-Distortion Optimized Quantization

In the existing AVS2 implementation, rate-distortion optimized quantization (RDOQ) is performed in a brute-force fashion. That is, for each non-zero quantized coefficient, every possible quantized value of that coefficient (usually level, level—1, . . . , 0) is tried in a search to minimize the rate-distortion cost of encoding the transform block.

There are a number of drawbacks to the current RDOQ approach, including inefficiency due to the computational burden of the brute-force approach, and inaccuracy due to a lack of criteria to select a best "last" coefficient for a transform block.

In one aspect of the present application, a new RDOQ approach is proposed using the above-described two-level coding structure (i.e. coefficient groups). In this approach a doubly-linked list data structure is used to realize improved last-coefficient selection, faster computation, and a reduced memory footprint. Because the above-described encoding and decoding processes rely upon run-length coding of transform coefficients, RDOQ is complicated by the fact that a change to one coefficient (e.g. changing a non-zero to a zero) can impact the previous run-level pair (in reverse scan order). In fact, the current run-level pair is eliminated if the coefficient is reduced to zero and the previous run is extended. Accordingly, traditional data structures, like an array, are inappropriate for reflecting these linkages.

The doubly-linked list for the present RDOQ approach may have nodes that are defined, for example, as follows:

```
Struct node {
    Int level;
    Int run;
    Struct node *previous;
    Struct node *next;
};
```

The doubly-linked list may then be defined, for example, as follows:

```
Struct list {
    Struct node *head;
    Struct node *tail;
}
```

There are two basic operations in the doubly-linked list: node appending and node removal. To begin, the list is initialized such that its head and tail are empty. During the reverse scanning of a coefficient group, when a level-run pair is encountered, a node is created and appended to the tail of the linked list. This process continues until the upper-left-most coefficient in the coefficient group is reached.

Reference is now made to FIG. 11, which shows an example coefficient group 700. In this example, the coefficients, in reverse scan order starting with the last non-zero coefficient in the coefficient group, are as follows:

1, −1, 0, 0, 0, 0, 2, 0, 1, −5

Reference is now also made to FIG. 12, which diagrammatically illustrates an example of a doubly-linked list 710 corresponding to the coefficient group of FIG. 11. The list 710 is built by reading the coefficients in reverse scan order and creating a new node for each non-zero coefficient. The run value is updated with each zero coefficient.

Once the doubly-linked list 710 has been created, it is useful in performing RDOQ analysis in that when a non-zero coefficient is turned into a zero coefficient the corresponding node is removed from the doubly-linked list.

To illustrate, reference is now made to FIG. 13, which shows the doubly-linked list 710 of FIG. 12 after the second node (−1, 4) is removed. In this illustrates scenario, the −1 coefficient has been turned into a zero coefficient. As a result the node (−1, 4) is removed and the previous node (1, 0) takes over its run value plus one. As a result, the first or head node now contains the level-run pair (1, 5) and the association of the second nodes previous and next nodes now become directly linked.

To select the quantized level of a transform coefficient c in RDOQ, the following rate distortion costs are calculated for each candidate level u:

If u != 0,
    $J(u) = D(Q^{-1}(u),c) + \lambda \cdot (R(run_{curr}) + R(u) + R(run_{prev}))$
Else
    $J(u) = D(Q^{-1}(0),c) + \lambda \cdot (R(run_{curr} + 1 + run_{prev}))$ where $Q^{-1}()$ is the dequantization function, $R()$ is the rate estimation function. $run_{curr}$ is the run of the current level-run pair, and $run_{prev}$ is the run of the previous level-run pair in the reverse scan order. In the case that the current level-run pair is the last level-run pair in the coefficient group, $run_{prev}$ is set as the last run of that coefficient group.

In another embodiment, the cost may be calculated based upon partial runs. For example, the cost expressions could be given by:

If u != 0,
    $J(u) = D(Q^{-1}(u),c) + \lambda \cdot (R(partial(run_{curr})) + R(u) + R(run_{prev}))$
Else
    $J(u) = D(Q^{-1}(0),c) + \lambda \cdot (R(partial(run_{curr} + 1 + run_{prev})))$ Partial run rate is the rate estimation of the run without the terminal bin 1 in unary binarization. For example, the unary binarization of run=3 is 0001. The partial run is 000. Since the next level is supposed to be unknown, it may be more appropriate to use the partial run.

Figure 14:
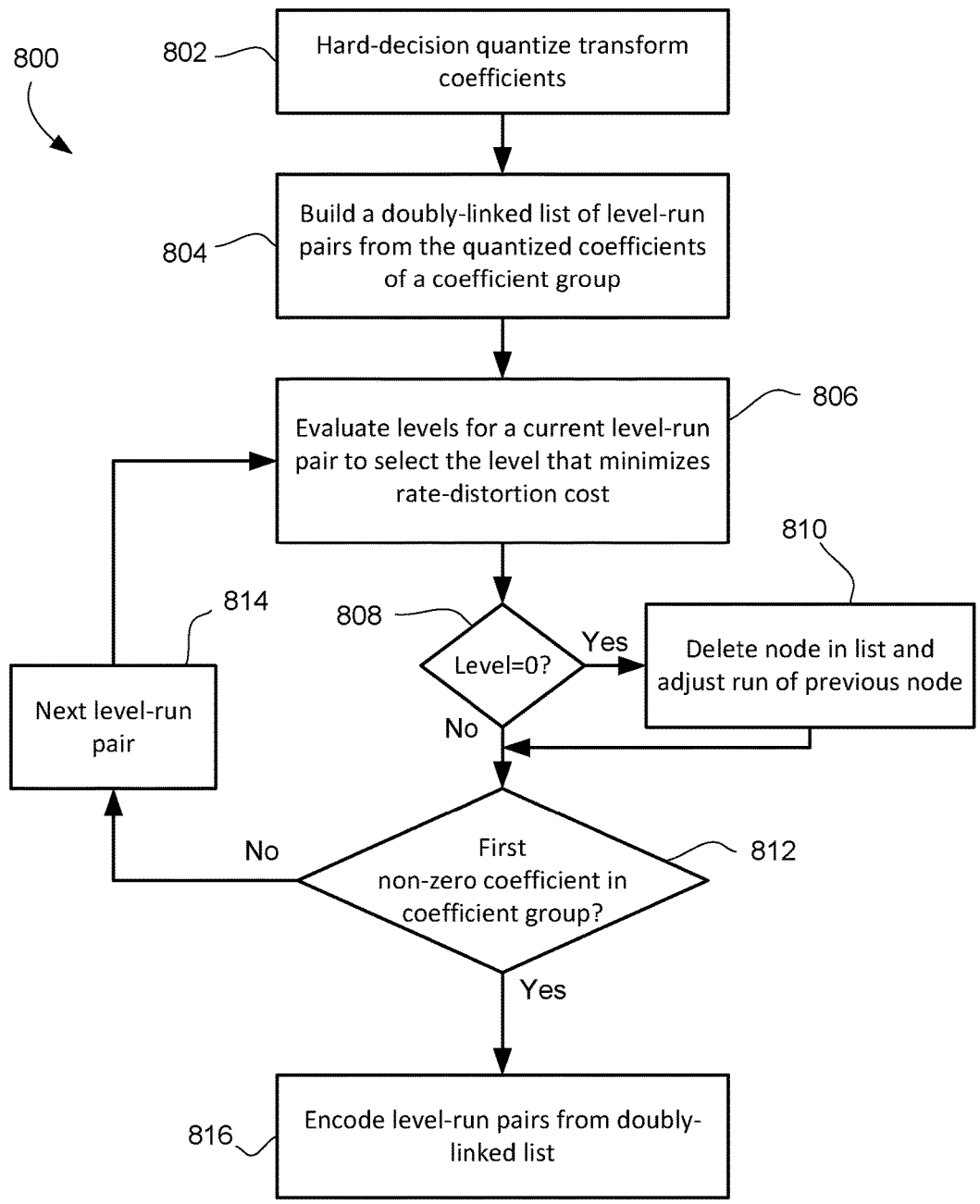
FIG. 14 shows, in flowchart form, an example process for encoding transform coefficients using RDOQ.

Reference is now made to FIG. 14, which shows, in flowchart form, an example process 800 for performing RDOQ using a doubly-linked list data structure.

The process 800 begins in operation 802 with hard quantization of the transform coefficients to arrive at the levels. Based on this operation the encoder knows which coefficient groups contain all zero quantized coefficients so they need not be encoded. The encoder then builds the doubly-linked list for a coefficient group in operation 804 by reading the level-run pairs in reverse scan order within the coefficient group and adding a node for each non-zero coefficient.

At operation 806, the encoder may then engage in RDOQ by evaluating a current level-run pair/node by testing different level values for rate-distortion cost. In one embodiment, one of the cost expressions above may be used. The level resulting in the minimum rate-distortion cost is selected.

At operation 808, the encoder assesses whether the selected level is zero. If so, then in operation 810 the encoder removes the current node from the doubly-linked list and adjusts the run of the previous node. Note that in some embodiments, the first or head node may not be included in the present RDOQ process. In some embodiments, a second RDOQ process is performed after this example process 800 wherein coefficients are evaluated to determine which of them best serves as the last non-zero coefficient, either on a coefficient group basis or on a transform block basis.

In operation 812, the encoder determines whether it has processed the first pair in the coefficient group, i.e. the tail node of the doubly-linked list. If not, then the encoder moves to the next node (level-run pair) in operation 814 and returns to operation 806. If it has reached the end of the doubly-linked list, then the encoder proceeds to operation 816, where it encodes the level-run pairs in the RDOQ-optimized doubly-linked list.

As mentioned above, the present process 800 may be followed by a second RDOQ process in which the non-zero coefficients are evaluated as the last non-zero coefficient in the coefficient group and/or transform block. Using a rate-distortion cost expression, the encoder determines whether it would be advantageous to select a different coefficient as the last non-zero coefficient, effectively zeroing the subsequent non-zero coefficients that survived the first RDOQ process 800.

It will be appreciated that the decoder and/or encoder according to the present application may be implemented in a number of computing devices, including, without limitation, servers, suitably-programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable non-transitory computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of decoding video from a bitstream of encoded video using a video decoder, the video including a picture partitioned into blocks, residual data for the blocks being spectrally transformed into transform blocks, each transform block being further partitioned into coefficient groups, the method comprising:
   decoding last-coefficient-group data indicating a last coefficient group in a group scan order that contains a non-zero transform coefficient;
   decoding last-coefficient data indicating a position, in said last coefficient group, of a last non-zero transform coefficient in a scan order within the last coefficient group;
   decoding level, run, and sign data for said last coefficient group to reconstruct transform coefficients of the last coefficient group;
   decoding significant-coefficient group flags indicating which of the coefficient groups contain non-zero coefficients;
   for each coefficient group that contains a non-zero coefficient, between said last coefficient group and an upper-left-most coefficient group in a reverse of the group scan order, decoding level, run and sign data for reconstructing transform coefficients of the respective coefficient group; and
   reconstructing and outputting the picture based on the transform coefficients,
   wherein decoding run data comprises decoding truncated runs that stop at respective boundaries of the coefficient groups.

2. The method claimed in claim 1, wherein said group scan order comprises an ordering of the coefficient groups in a block starting from the upper-left-most coefficient group, and wherein the coefficient groups of the block are decoded by the decoder in the reverse of the group scan order.

3. The method claimed in claim 1, wherein said scan order comprises an ordering of transform coefficients within a coefficient group starting from an upper-left-most transform coefficient in the group, and wherein level, run and sign data for transform coefficients in a coefficient group are decoded in the reverse of the scan order.

4. The method claimed in claim 1, wherein said last-coefficient data comprises an x-position and a y-position of the last non-zero transform coefficient within said last coefficient group.

5. The method claimed in claim 4, further including first decoding a first-CG flag indicating whether said last coefficient group is the upper-left-most coefficient group, and, if such is not the case, decoding the x-position of said last coefficient group, and wherein if the x-position is 0, then decoding a y-value indicating the y-position of the last coefficient group and adding 1 to the decoded y-value.

6. The method claimed in claim 1, wherein decoding level, run and sign data for transform coefficients of the respective coefficient group further includes decoding, for each coefficient group that contains a non-zero coefficient, between said last coefficient group and said upper-left-most coefficient group in the reverse of the group scan order, a position of a respective last non-zero coefficient in the scan order within the respective coefficient group.

7. The method claimed in claim 6, wherein decoding the position of the respective last non-zero coefficient in the scan order within the respective coefficient group includes decoding a last run value indicating the number of zeros in the scan order between said respective last non-zero coefficient in the respective coefficient group and a bottom-right-most coefficient.

8. A decoder for decoding a bitstream of encoded video, the video including a picture partitioned into blocks, residual data for the blocks being spectrally transformed into transform blocks, each transform block being further partitioned into coefficient groups, the decoder comprising:
   a processor;
   a memory; and
   a decoding application stored in memory and containing instructions that, when executed, cause the processor to:
      decode last-coefficient-group data indicating a last coefficient group in a group scan order that contains a non-zero transform coefficient;
      decode last-coefficient data indicating a position, in said last coefficient group, of a last non-zero transform coefficient in a scan order within the last coefficient group;
      decode level, run, and sign data for said last coefficient group to reconstruct transform coefficients of the last coefficient group;
      decode significant-coefficient group flags indicating which of the coefficient groups contain non-zero coefficients;
      for each coefficient group that contains a non-zero coefficient, between said last coefficient group and an upper-left-most coefficient group in a reverse of the group scan order, decode level, run and sign data for reconstructing transform coefficients of the respective coefficient group; and
      reconstruct and output the picture based on the transform coefficients,
      wherein decoding run data comprises decoding truncated runs that stop at respective boundaries of the coefficient groups.

9. A non-transitory processor-readable medium storing processor-executable instructions for decoding a bitstream of encoded video, the video including a picture partitioned into blocks, residual data for the blocks being spectrally transformed into transform blocks, each transform block being further partitioned into coefficient groups, wherein the instructions, when executed, cause one or more processors to:

decode last-coefficient-group data indicating a last coefficient group in a group scan order that contains a non-zero transform coefficient;

decode last-coefficient data indicating a position, in said last coefficient group, of a last non-zero transform coefficient in a scan order within the last coefficient group;

decode level, run, and sign data for said last coefficient group to reconstruct transform coefficients of the last coefficient group;

decode significant-coefficient group flags indicating which of the coefficient groups contain non-zero coefficients;

for each coefficient group that contains a non-zero coefficient, between said last coefficient group and an upper-left-most coefficient group in a reverse of the group scan order, decode level, run and sign data for reconstructing transform coefficients of the respective coefficient group; and reconstruct and output the picture based on the transform coefficients, wherein decoding run data comprises decoding truncated runs that stop at respective boundaries of the coefficient groups.

10. A method of encoding video using a video encoder, the video including a picture partitioned into blocks, residual data for the blocks being spectrally transformed into transform blocks, each transform block being further partitioned into coefficient groups, the method comprising:

encoding last-coefficient-group data indicating a last coefficient group in a group scan order that contains a non-zero transform coefficient;

encoding last-coefficient data indicating a position, in said last coefficient group, of a last non-zero transform coefficient in a scan order within the last coefficient group;

encoding level, run, and sign data for said last coefficient group to reconstruct transform coefficients of the last coefficient group;

encoding significant-coefficient group flags indicating which of the coefficient groups contain non-zero coefficients;

for each coefficient group that contains a non-zero coefficient, between said last coefficient group and an upper-left-most coefficient group in a reverse of the group scan order, encoding level, run and sign data for reconstructing transform coefficients of the respective coefficient group; and outputting a bitstream of encoded data for the picture, wherein encoding run data comprises encoding truncated runs that stop at respective boundaries of the coefficient groups.

11. The method claimed in claim 10, wherein said group scan order comprises an ordering of the coefficient groups in a block starting from the upper-left-most coefficient group, and wherein the coefficient groups of the block are encoded by the encoder in the reverse of the group scan order.

12. The method claimed in claim 10, wherein said scan order comprises an ordering of transform coefficients within a coefficient group starting from an upper-left-most transform coefficient in the group, and wherein level, run and sign data for transform coefficients in a coefficient group are encoded in the reverse of the scan order.

13. The method claimed in claim 10, wherein said last-coefficient data comprises an x-position and a y-position of the last non-zero transform coefficient within said last coefficient group.

14. The method claimed in claim 13, further including first encoding a first-significant-coefficient group flag indicating whether said last coefficient group is the upper-left-most coefficient group, and, if such is not the case, encoding the x-position of said last coefficient group, and wherein if the x-position is 0, then subtracting 1 from the y-position of said last coefficient group to create a y-value and encoding the y-value.

15. The method claimed in claim 10, wherein encoding level, run and sign data for transform coefficients of the respective coefficient group further includes encoding, for each coefficient group that contains a non-zero coefficient, between said last coefficient group and said upper-left-most coefficient group in the reverse of the group scan order, a position of a respective last non-zero coefficient in the scan order within the respective coefficient group.

16. The method claimed in claim 15, wherein encoding the position of the respective last non-zero coefficient in the scan order within the respective coefficient group includes encoding a last run value indicating the number of zeros in the scan order between said respective last non-zero coefficient in the respective coefficient group and a bottom-right-most coefficient.

17. An encoder for encoding video, the video including a picture partitioned into blocks, residual data for the blocks being spectrally transformed into transform blocks, each transform block being further partitioned into coefficient groups, the encoder comprising:

a processor;

a memory; and an encoding application stored in memory and containing instructions that, when executed, cause the processor to:

encode last-coefficient-group data indicating a last coefficient group in a group scan order that contains a non-zero transform coefficient;

encode last-coefficient data indicating a position, in said last coefficient group, of a last non-zero transform coefficient in a scan order within the last coefficient group;

encode level, run, and sign data for said last coefficient group to reconstruct transform coefficients of the last coefficient group;

encode significant-coefficient group flags indicating which of the coefficient groups contain non-zero coefficients;

for each coefficient group that contains a non-zero coefficient, between said last coefficient group and an upper-left-most coefficient group in a reverse of the group scan order, encode level, run and sign data for reconstructing transform coefficients of the respective coefficient group; and output a bitstream of encoded data for the picture, wherein encoding run data comprises encoding truncated runs that stop at respective boundaries of the coefficient groups.

18. A non-transitory processor-readable medium storing processor-executable instructions for encoding video, the video including a picture partitioned into blocks, residual data for the blocks being spectrally transformed into transform blocks, each transform block being further partitioned into coefficient groups, wherein the instructions, when executed, configure one or more processors to:

encode last-coefficient-group data indicating a last coefficient group in a group scan order that contains a non-zero transform coefficient;

encode last-coefficient data indicating a position, in said last coefficient group, of a last non-zero transform coefficient in a scan order within the last coefficient group;

encode level, run, and sign data for said last coefficient group to reconstruct transform coefficients of the last coefficient group;

encode significant-coefficient group flags indicating which of the coefficient groups contain non-zero coefficients;

for each coefficient group that contains a non-zero coefficient, between said last coefficient group and an upper-left-most coefficient group in a reverse of the group scan order, encode level, run and sign data for reconstructing transform coefficients of the respective coefficient group; and output a bitstream of encoded data for the picture, wherein encoding run data comprises encoding truncated runs that stop at respective boundaries of the coefficient groups.

\* \* \* \* \*